(12) United States Patent
Heimann et al.

(10) Patent No.: US 6,399,021 B1
(45) Date of Patent: Jun. 4, 2002

(54) METHOD OF TREATING CONCRETE STRUCTURES

(75) Inventors: Robert L. Heimann; William M. Dalton, both of Moberly; David R. Webb, Macon; Nancy M. McGowan, Sturgeon, all of MO (US)

(73) Assignee: Elisha Technologies Co LLC, Moberly, MO (US)

( * ) Notice: Subject to any disclaimer, the term of this patent is extended or adjusted under 35 U.S.C. 154(b) by 10 days.

(21) Appl. No.: 09/608,843

(22) Filed: Jun. 30, 2000

Related U.S. Application Data

(63) Continuation of application No. 08/980,475, filed on Nov. 28, 1997, now Pat. No. 6,106,741, which is a continuation of application No. 08/936,152, filed on Sep. 24, 1997, now Pat. No. 6,080,334, and a continuation-in-part of application No. 08/634,215, filed on Apr. 18, 1996, now abandoned, and a continuation-in-part of application No. 08/476,271, filed on Jun. 7, 1995, now abandoned, which is a continuation-in-part of application No. 08/327,438, filed on Oct. 21, 1994, now Pat. No. 5,714,093.

(51) Int. Cl.$^7$ ................................................ C23F 11/00
(52) U.S. Cl. ................................ 422/7; 422/6; 422/18; 252/389.62; 252/389.3; 106/14.44; 427/207.1
(58) Field of Search ........................... 422/6, 7, 12, 14, 422/18, 40; 252/389.62, 389.3; 106/14.44; 427/207.1

(56) References Cited

U.S. PATENT DOCUMENTS

| | | |
|---|---|---|
| 2,952,562 A | 9/1960 | Morris et al. |
| 2,995,529 A | 8/1961 | Smith-Johannsen |
| 3,425,207 A | 2/1969 | Campbell ...................... 57/145 |
| 3,646,748 A | 3/1972 | Lang ............................ 57/149 |
| 3,661,663 A | 5/1972 | Shannon |
| 3,700,012 A | 10/1972 | Alderfer ...................... 140/149 |
| 3,778,994 A | 12/1973 | Humphries ................... 57/149 |
| 3,832,204 A | 8/1974 | Boaz |
| 3,885,380 A | 5/1975 | Hacker ......................... 57/162 |
| 3,903,013 A | 9/1975 | Foord et al. ................. 252/317 |
| 3,912,548 A | 10/1975 | Faigen .................. 148/6.15 R |
| 3,917,648 A | 11/1975 | McLeod |
| 3,919,762 A | 11/1975 | Borelly |
| 3,972,304 A | 8/1976 | Boucher |
| 3,979,896 A | 9/1976 | Klett et al. |
| 3,996,413 A | 12/1976 | Foord et al. |
| 4,098,720 A | 7/1978 | Hwa |
| 4,123,894 A | 11/1978 | Hughes et al. |
| 4,133,823 A | 1/1979 | Joyce et al. |
| 4,144,074 A | 3/1979 | Itoh et al. |
| 4,189,619 A | 2/1980 | Pedlow |
| 4,197,695 A | 4/1980 | Hughes et al. |
| RE30,612 E | 5/1981 | Harris et al. |
| 4,341,878 A | 7/1982 | Marcantonio et al. |
| 4,344,278 A | 8/1982 | Jamison et al. |
| 4,347,285 A | 8/1982 | Batdorf |
| 4,445,321 A | 5/1984 | Hutchinson |
| 4,446,254 A | 5/1984 | Nakae et al. |
| 4,473,936 A | 10/1984 | Kellner et al. |
| 4,490,969 A | 1/1985 | Simpson et al. |
| 4,555,445 A | 11/1985 | Frey et al. |
| 4,595,425 A | 6/1986 | Harding |
| 4,623,504 A | 11/1986 | Smith |
| 4,635,432 A | 1/1987 | Wheeler |
| 4,635,433 A | 1/1987 | Takei et al. |
| 4,643,769 A | 2/1987 | Othen |
| 4,645,790 A | 2/1987 | Frey et al. |
| 4,661,387 A | 4/1987 | Watanabe et al. |
| 4,681,749 A | 7/1987 | Usui et al. |
| 4,683,019 A | 7/1987 | Motoki |

(List continued on next page.)

FOREIGN PATENT DOCUMENTS

| | | |
|---|---|---|
| DE | 3618841 A1 | 3/1988 |
| FR | 2553442 | 4/1985 |
| FR | 2655060 | 5/1991 |
| GB | 2099416 | 12/1982 |
| JP | 61102969 A * | 5/1986 |
| JP | 5195233 | 8/1993 |
| JP | 93195233 | 8/1993 |
| JP | 93195252 | 8/1993 |
| JP | 08091959 A * | 4/1996 |
| WO | PCT/US95/13441 | 10/1995 |
| WO | WO 96/12770 | 5/1996 |

OTHER PUBLICATIONS

Wiederholt, Wilhelm. "Corrosion and corrosion prevention. 10b. Corrosion prevention by inorganic plating," VDI, 113(10), abstract, 1971.*

(List continued on next page.)

*Primary Examiner*—Elizabeth McKane
(74) *Attorney, Agent, or Firm*—Michael K. Boyer

(57) ABSTRACT

A system is disclosed for inhibiting the corrosion of ferrous and other metals by passivating the metals. The system includes novel buffered compositions which may be applied to metal products, and novel combinations thereof with metals, for preventing or retarding corrosion, as well as methods for applying the buffered compositions to metal products, such that corrosion protection of the products is achieved. The methods include an in-situ application to existing structures with metal reinforcement as well as applications to metal products during manufacture. Generally, the compositions may be in various forms and comprise one or more layers, at least one of which includes a water repellent but water vapor permeable carrier component and one or more pH buffer components. The buffer is selected to produce a passivating pH at the surface of the metal. The compositions are environmentally friendly and are capable of replacing chromates which have been traditionally used with zinc and zinc alloys to inhibit corrosion of metals but which are potentially harmful to the environment.

15 Claims, No Drawings

U.S. PATENT DOCUMENTS

| | | | |
|---|---|---|---|
| 4,776,161 A | | 10/1988 | Sato et al. |
| 4,842,645 A | | 6/1989 | Miyata et al. |
| 4,849,282 A | | 7/1989 | Watanabe et al. |
| 4,870,814 A | | 10/1989 | Chacko et al. |
| 4,921,731 A | | 5/1990 | Clark et al. |
| 4,961,878 A | | 10/1990 | Mullins |
| 4,985,313 A | | 1/1991 | Penneck et al. |
| 5,004,562 A | | 4/1991 | Kissel |
| 5,004,563 A | | 4/1991 | Kissel |
| 5,028,489 A | | 7/1991 | Kissel |
| 5,041,486 A | | 8/1991 | Kissel |
| 5,068,134 A | | 11/1991 | Cole et al. |
| 5,092,923 A | * | 3/1992 | Dillard et al. ........... 106/14.05 |
| 5,121,573 A | | 6/1992 | Vassena |
| 5,137,706 A | | 8/1992 | Annen et al. |
| 5,139,820 A | | 8/1992 | Sawada et al. |
| 5,149,439 A | | 9/1992 | Birchall |
| 5,158,605 A | | 10/1992 | Kissel |
| 5,164,003 A | | 11/1992 | Bosco et al. |
| 5,166,248 A | | 11/1992 | Kissel |
| 5,167,785 A | | 12/1992 | McCready |
| 5,208,077 A | | 5/1993 | Proctor et al. |
| 5,209,987 A | | 5/1993 | Penneck et al. |
| 5,262,464 A | | 11/1993 | Koevenig et al. |
| 5,292,799 A | | 3/1994 | Naito et al. |
| 5,330,794 A | | 7/1994 | Bosco et al. |
| 5,338,434 A | | 8/1994 | Rühl et al. |
| 5,352,342 A | | 10/1994 | Riffe ........................ 204/147 |
| 5,399,435 A | | 3/1995 | Ando et al. ................ 428/428 |
| 5,432,007 A | | 7/1995 | Naito ........................ 428/447 |
| 5,683,519 A | | 11/1997 | Mannhart ................... 134/15 |
| 5,683,642 A | | 11/1997 | Muguruma et al. |
| 5,700,523 A | | 12/1997 | Petrole et al. ........... 427/397.8 |
| 5,714,093 A | | 2/1998 | Heimann et al. ...... 252/389.62 |
| 5,871,668 A | | 2/1999 | Heimann et al. ...... 252/389.62 |
| 5,928,796 A | | 7/1999 | Heimann et al. ........... 428/469 |
| 6,027,796 A | | 2/2000 | Kondoh et al. .......... 428/312.8 |

OTHER PUBLICATIONS

Abayarathna, Dharma, "Measurement of Corrosion Under Insulation and Effectiveness of Protective Coatings," NACE 1997.

Abayarathna, Dharma et al, "Monitoring of Corrosion Under Insulation and Effectiveness of Protections Applied," Corrosion '96, NACE T–5A–30a Task Group Meeting, 1996.

Armstrong, R.D. et al. "Behavior of Sodium Silicate and Sodium Phosphate (Tribasic) as Corrosion Inhibitors for Sodium Phosphate (Tribasic) as Corrosion Inhibitors for Iron," Journal of Applied Electrochemistry, vol. 24, pp. 1244–1248, 1994.

Armstrong, R.D. et al. "The Corrosion Inhibition of Iron by Silicate Related Materials," Corrosion Science, vol. 28, No. 12, pp. 1177–1181, 1988.

Bailey, E.H. et al. "Catastrophes in Earth History—Extrusive and Intrusive Catastrophes," California Division of Mines and Geology, Bulletin 183, p. 177.

Bernard, M.C. et al. "In Situ Raman Study of the Corrosion of Zinc–Coated Steel in the Presence of Chloride," Journal of Electrochemical Society, vol. 142, No. 7, Jul. 1995.

Borovski, B.I., et al. "Protection of Metals from Corrosion in Atmospheric Conditions with Changed Moisture Values," .6 Lakokras Mater Ikh Primen (1978), pp. 24–26.

Cartledge, G.H. "The Existence of a Flade Potential on Iron Inhibited by Ions of the XD 4th Type," Journal of Electrochemical Society, vol. 114, No. 1, pp. 973–980, (1957).

Cartledge, G.H. "The Mechanism of the Inhibition of Corrosion by the Pertechnetate Ion, Part IV, Comparison with Othr XO 4th Inhibitors," J. Electrochem, Soc. vol. 100, pp. 1037–1043, Aug. 1956.

Cartledge, G.H. "Noncathodic Effects of the Permanganate Ion in the Anodic Passivation of Iron," Journal of Electrochemical Society, vol. 114, No. 1, pp. 39–42, 1967.

Cartledge, G.H. "The Passivation of Iron in the Presence of Pertechnetate and Chromate," Journal of Electrochemical Society, vol. 113, No. 4, pp. 28–333, 1968.

"Corrosion in Structures," ASM. vol. 13, p. 1307, Metal Handbook, 9th Ed., 1987.

"Corrosion of Metals in Concrete," Report of Committee No. 222, American Concrete Institute, Report No. ACI 222–R–89 (1989).

Dalton, Bill, "Thin Film Corrosion Coatings for Hardware," NAVSEA 1996, Jun. 6, 1996.

Freyermuth, Clifford H., "Durability of Post–Tensioned Prestressed Concrete Structures," Concrete International, pp. 58–65 (Oct. 1991).

Heimann, Bob, "Solution for Crevice Corrosion in Wire Rope with Intelligent Material," NAVSEA 1996, Jun. 6, 1996.

Hinton, Bruce, "Zirconium Oxide Pretreatment," Metal Finishings, p. 61, Sep. 1991.

"Influence of Atmospheric Variables," pp. 22–23, published in Zinc—Its Corrosion Resistance a Study Commissioned by Intrnational Lead Zinc Research Organization, Inc. by C.J. Slunder et. 1971.

McGowan, Nancy, "Innovation and Environmentally Benign Solution for Corrosion Under Insulation (C.U.I.) for Steam Process Piping," NAVSEA 1996, Jun. 6, 1996.

McGowan, Nancy, "Effective T echnology for Corrosion Under Insulation and Effectiveness of Protective Coatings," Presented at NACE 1997.

Munger, C.G. "The Chemistry of Zinc Silicate Coatings," Corrosion Prevention and Control, pp 140–143, Dec. 1994.

Nagata, Hideki et al. "Analytical Study of the Formation Process of Hemimorphite, Part II, Analysis of the Formation Process from Corrosion Product s of Zinc by the Anodic Oxidaton Method," Zairyo to Kankyo, vol. 42, pp 377–383, 1992.

Oprya, V.Y. et al "The Chemical Stability of Paints with an Enamel XV–794 Base in the Proximity of Poisons," 4 Lakokras Mater Ikh Primen (1968), pp. 26–28.

Osada, Yoshito and Simon B. Ross–Murphy, "Intelligent Gels," Scientific American, pp. 82–87 (May 1993).

Parker, R.L. "Crystal Growth," Proceedings of t he Fifth International Conference on Crystal Growth, Cambridge, Mass. 1977.

Prokofyeva, M.L. et al. "The Influence of Several Factors in the Production of Zinc Silicate Paints," 4 Lakokrasoch mater Ikh Primen (1968), pp. 28–29.

Pyor, M.J. et al. "The Inhibition of the Corrosion of Iron by Some Anodic Inhibitors," Journal of Electrochemical Society, vol. 100, No. 3, pp. 203–215, 195 Prior Art.

Robertson, W.D. "Molybdate and Tungstate as Corrosion Inhibitors and the Mechanism of Inhibition," Journal of Electrochemical Society, vol. 98, No. 3, pp. 94–100, (1951).

Ross, Philip E., "Smart Jell–O," Forbes, pp. 150–151 (Feb. 14, 1994).

Schupack, Morris, "Durability Study of a 35–Year–Old Post–Tensioned Bridge," Concrete International, pp. 54–58 (Feb. 1994).

Scovil, Jeff, "Crystal Clear," Earth, pp. 58–60, Apr. 1997.

Sergi, G. et al. "Corrosion of Galvanized and Galvannealed Steel in Solutions of pH 9.0 to 14.0" Corrosion, vol. 41(II), 618–624, 1985.

Suziki, Ichiro et al. "Zinc–Zinc Chloride Composite Electrodeposited Steel Sheet," Corrosion Science, vol. 28(5), pp. 475–486, 1987.

Tanka, Yoshito, Makoto Kurauchi and Yoji Masuda, Ten Year Marine Atmosphere Exposure TEst of Unbonded Prestressed Concrete Prisms, Post–Tensioning Institute, Phoenix, Arizona (1988).

Taylor, H.F.W. "The Dehyudration of Hemimorphite" The American Mineralogist, vol. 47, pp. 932–945, Jul.–Aug. 1962.

Uhlig, H. "The Flade Potential of Ions Passivated Inorganic Corrosion Inhibitors," Journal of Elect rochemical Society, vol. 106, No. 1, pp. 1–7, (1959).

Vejvoda, Miroslav, "Post Tensioned Industrial Floors," Concrete International (Jan. 1993).

WPIDS 88–092325, 1988.

Weisstavch, A. et al. "An Electrochemical Study of Heterpoly Molybdates as Cooling WaterCorrosion Inhibitors," Corrosion, vol. 28, No. 8, pp. 299–306, 1972.

Williams, L.F.G., "Initiation of Corrosion of Chromated Zinc–Zinc Electroplate on Steel," Corrosion Science, vol. 13, No. 11, pp. 865–868, 1973.

Wolkomir, Richard, "Inside the Lab and Out, Concrete is More Than It's Cracked Up to Be," Smithosian, pp. 22–31 (Jan. 1994).

Wroblowa, H.S. et al. "The Mechanism of Oxygen Reducton on Zinc," Journal of Electrochemical Society, vol. 295, pp. 153–161, 1990.

Ziegler Method, Hawley's Condensed Chemical Dictionary, 11th Ed., pp. 1249–1257, 1987.

"Zinc Blonde," p. 3378, (1992).

* cited by examiner

METHOD OF TREATING CONCRETE STRUCTURES

RELATED PATENT APPLICATION

This application is a continuation of patent application Ser. No. 08/980,475 filed Nov. 28, 1997, now U.S. Pat. No. 6,106,741, which is a continuation of patent application Ser. No. 08/936,152 filed Sep. 24, 1997, now U.S. Pat. No. 6,080,334, and a continuation-in-part of patent application Ser. No. 08/634,215 filed Apr. 18, 1996, now abandoned, and a continuation-in-part of patent application Ser. No. 08/476,271 filed on Jun. 7, 1995, now abandoned, which is a continuation-in-part of application Ser. No. 08/327,438 filed on Oct. 21, 1994 now U.S. Pat. No. 5,714,093.

BACKGROUND OF THE INVENTION

1. Field of the Invention

The present invention in a broad aspect relates to inhibiting the corrosion of metals. The invention more particularly concerns compositions and methods of controlling the pH proximate a point of incipient corrosion of a metal at a pH value where the metal is passive to corrosion. The invention more especially concerns coating compositions for metals that provide pH control at a metal surface for passivation. The coating compositions are water vapor permeable and comprise a reservoir layer that is preferably of a water repellent but semipermeable carrier in which one or more particulate or liquid passivating materials are dispersed. The passivating materials preferably include one or more particulate or liquid pH buffers, but can also include other types of corrosion preventative materials, such as corrosion inhibitors. The invention can take the form of a single layer coating or of a coating formed by a plurality of layers.

2. Related Art

The corrosion of steel and other metal products continues to be a serious technical problem which has profound effects an the economy and the standard of living. It causes premature replacement of infrastructure, which in turn causes loss of natural resources, and gives rise to inferior roads and buildings. It also causes premature replacement of equipment and parts in industry and in boats and other marine vehicles, automobiles, and aircraft.

The process of corrosion requires several physical conditions. These conditions include a metallic path, an electrolyte, anode, cathode, and a potential difference between the anode and the cathode (tendency to corrode) A metallic path allows the transfer of electrons between the anode and cathode sites; this path is normally the substrate metal. The electrolyte is normally an aqueous solution around the substrate metal and contains ionic species capable of transferring charge between the anode and the cathode of the substrate metal. The anode is the location where the substrate metal corrodes and mass loss occurs. At the anode, metal atoms lose electrons and convert to metal ions which are drawn into the surrounding electrolyte. At the cathode, ionic species receive electrons from the substrate metal and convert them back to molecular form. Potential difference (or tendency to corrode) between the anode and cathode can result from many different conditions which include: variations in metal or alloy compositions; difference in amount of dissolved oxygen; presence of impurities on the substrate; ionic strength and/or constituents; temperature differences; etc.

Corrosion can be prevented, halted, or reduced by interrupting the transfer of electrons, by changing the chemistry at the anode or cathode, or by isolating the substrate from the electrolyte. Methods to achieve the prevention of corrosion include the use of barrier coatings or claddings, sacrificial coatings, corrosion inhibitors, cathode protection, and surface passivation. The barrier coatings or claddings include paints, organic coatings, ceramic and inorganic coatings, plastics, noble metal platings or claddings (such as nickel) and more.

Sacrificial coatings prevent corrosion by having a greater tendency to corrode than the metal they protect, thus converting the substrate metal to a more noble (non-corrosive) potential. Sacrificial coatings include zinc, aluminum, and magnesium metals and alloys applied as claddings, hot dip coatings, platings, or as fillers in primers and paints or other organic coatings. corrosion inhibitors change the surface chemistry at the interface between the metal substrate and the electrolyte solution. This interface barrier may be formed by oxidizing the anode surface, precipitating a film or barrier layer that limits diffusion of ionic species between the bulk electrolyte and the substrate surface, or by adsorbing compounds which impart a hydrophobic film to the substrate metal surface. Cathodic protection of a substrate surface may be achieved by converting the entire surface of the substrate metal to a cathode through the use of sacrificial anodes or impressed electrical current. Surface passivation involves importing an oxide film to the substrate metal surface, thus preventing or reducing the tendency of the substrate metal to develop anode and cathode sites. Metallic substrates develop passive surfaces in specific environments or when exposed to solutions with specific pH ranges. For example, steel and iron substrates are naturally passive when exposed to aqueous solutions that have a pH of 8.5 or above. Aluminum also has a naturally passive surface due to an oxide that forms a tightly adherent oxide film limiting further exposure of oxygen to the metal substrate. Passive films, however, can be attacked and compromised by certain ionic species. In the case of iron and iron alloy materials, the naturally passive surface can be compromised by chloride ions and hydrogen ions, among others.

The previously mentioned mechanisms of corrosion protection have various drawbacks. Barrier coatings can be expensive and offer very little protection against corrosion if they are compromised, damaged mechanically, or have insufficient coverage. Sacrificial coatings have the potential of creating embrittlement of high strength steels due to the creation of monatomic hydrogen by-products from the corrosion reaction. The coatings may also be rapidly used up under certain accelerated corrosion conditions. Corrosion inhibitors are often expensive and some have been shown to be environmentally unfriendly or toxic. Many of these are available only as liquids making them inappropriate for certain applications as they function best in certain concentration ranges. Cathodic protection can be an expensive protection means that requires skilled professionals for its design and application. It is more readily applicable to new structures, but is difficult and/or expensive to install on an existing structure. Surface passivation has been used relatively little because it requires control of the environment around the substrate metal surface.

In nature, stable materials exist at their lowest form of energy. Iron typically exists as iron oxide ore. Mankind spends a tremendous amount of money refining and adding energy to the iron ore to create steel and other iron products with the necessary properties for fabrication of metal products and for construction of roads, bridges, buildings, and the like. The natural response of such products to the environment is to return to their lowest, most stable energy state, i.e., the iron oxide state. This corrosion process is accelerated when the products are exposed to corrosive constituents in the environment. Large amounts of time and money are expended annually in the use of coating materials to inhibit such corrosion.

Eight types of corrosion are defined by the National Society of Corrosion Engineers, namely: (1) General; (2) Localized; (3) Galvanic; (4) Environmental Cracking; (5) Erosion-Corrosion Cavitation and Fretting; (6) Intergranular; (7) Dealloying; and (8) High Temperature. General corrosion results from open exposure to corrosive conditions. Localized corrosion affects smaller portions of the metal surface than general corrosion but the rate of penetration may be very fast. Crevice corrosion is a form of localized corrosion resulting from corrosive exposure in a shielded location where oxygen depletion occurs. The oxygen depletion results in the development of acidic conditions which accelerate the corrosive loss of base metal. Electromotive corrosion is an accelerated form of localized corrosion due to stray electrical currents passing through an active corrosion cell.

General corrosion, crevice corrosion and electromotive corrosion are typically the kinds of corrosion of primary concern with iron and steel products. However, this invention is not only applicable in inhibiting those kinds of corrosion, but also in inhibiting other types of corrosion.

Galvanic corrosion occurs when two metals with different potentials or tendencies to corrode are in metal-to-metal contact. Fretting corrosion is wear or the damage that occurs at the interface of two contacting surfaces, at least one of which is metal, when they are subject to rubbing, i.e., minute slippage relative to each other. Intergranular corrosion is a selective or localized attack at or adjacent to grain boundaries without appreciable attack in the grain. Dealloying corrosion is a phenomenon associated with selective removal of one or more components from an alloy.

Crevice corrosion is a special form of corrosive action in that it typically may involve a bacterial or microbial attack accompanied by an environmental change in pH with anaerobic conditions. Microbes that promote corrosion of metals can be classed into five general groups: 1) acid producers which oxidize sulfur compounds to change sulfur compounds to sulfuric acid; 2) slime formers which aid in the production of anaerobic micro environments; 3) sulfate reducers that consume hydrogen and depolarize cathodic sites; 4) hydrogen feeders which feed on hydrocarbons; and 5) metal ion concentrators/oxidizers that work in conjunction with other microbes to create thick, bulky deposits to create concentration cells. Typically, more than one type of microbe is working at any one crevice corrosion site in a symbiotic relationship, fostering the growth of others. This form of attack is often hard to detect, since by definition initiation is often in the small crevices concealed in an anaerobic site. These sites often exhibit deep pitting, compromising the structural integrity of the base metals under attack.

Conditions that favor the promulgation of corrosive microbes include anaerobic environments, pH in the range of 0.5–10 (depending on the type of microorganism), and high concentrations of hydrocarbons upon which the microbes feed. Metal strands used in concrete structures can be ideal initiation sites. The strands used in such structures are typically of 1×7 high strength steel construction. Unfortunately, almost as soon as such a concrete structure is placed, cracking begins to occur. These cracks allow liquid water and other corrosive materials to penetrate the structure and thereby compromise the integrity of the structure. The cracks become not only ideal crevice corrosion sites, but also places for potential physical degradation of a structure by alternating freeze and thaw cycles with the hydraulic force of ice and liquid water breaking up the concrete.

The current cable market for post tensioned and pretensioned pre-stressed concrete is dominated by bare steel 1×7 strand. Strand is available with a fusion bonded epoxy coating with the surface of the epoxy containing an optional aluminum oxide grit to promote bonding with concrete (ASTM Specification A882/A882M). In addition, 1×7 strand containing grease and covered with polyethylene is also available for specific applications. For bridge stays and tower supports, conduits manufactured from plastic or steel materials such as galvanized steel or polyethylene are currently typically used as containment for individual strands or multiple bundles of strands. The conduits are commonly filled with grout to strengthen the assembly and to fill in the interstices. The alkaline nature of the grout passivates the surface of the steel from corrosion. Strand and wire rope for the automotive industry and other general purpose uses currently typically have a zinc or zinc alloy hot dip coating and may be covered with a number of thermoplastic coatings. The zinc or zinc alloy coatings protect the surface of the steel from corrosion galvanically due to its sacrificial nature (it corrodes preferentially to steel).

Organic plastic materials have also been used to fill the interstices between the wires on some cable products. Ceramic based, corrosion resistant coatings have been developed and are currently in use in automotive parking brake cable strand products. However, ceramic coatings are not usually suitable for wire rope products because the abrasiveness of such coatings reduces fatigue life of the wire rope.

The use of bare strand products causes problems when exposed to corrosive environments. The strand surface is not protected from corrosive constituents in the environment. Strand stored to be placed in casting beds (forms that are reused time and time again for making of structural elements of precast concrete) often show signs of initial red rust before being surrounded by the protective encasement of concrete. In the case of strand used as a prestressor for concrete materials, corrosion can occur when corrosive constituents such as salts from deicing compounds, admixtures to the concrete, or marine environment migrate to the surface of the strand. Initially, the pH in concrete is near 12.0. Corrosiveness increases as the concrete pH drops or when carbonation occurs. Due to the chemical reactions incurred during the cure cycle of the concrete mixture, there are zones of cure that striate and promote cracking at the surface of the curing mixture. Depending upon the cure conditions, the types of admixtures and aggregates, and the surrounding physical conditions, this cracking may or may not be readily visible to the naked eye. The expansive forces caused by the development of corrosion on the steel strand or other steel reinforcement can also crack the concrete. Whatever their origin, cracks can accelerate the degradation of the concrete and also the degradation of prestressing strand (by exposing the steel), necessitating repair or replacement of the concrete member to avoid failure of the structure. Bare strand has no protection against corrosion except for the surrounding concrete. Rehabilitation projects often use sealers on cracked concrete to lessen the chance that liquid water or other corrosive elements will enter the cracks and accelerate the degradation process. Typically these sealers only provide a physical barrier and do not address the underlying steel components that are the subject of the corrosive attack.

Epoxy coated strand, the only current commercial alternative to bare strand for pretension prestressing applications, has a number of limitations. The epoxy coating effectively offers only barrier protection against corrosive constituents. When the barrier has been compromised due to coating imperfections or field handling, corrosive constituents can get to the strand wires and cause local corrosion to develop. The corrosive constituents can then migrate beneath the epoxy coating, developing crevice corrosion cells and cause delamination of the epoxy coating from the surface of the strand wires. Crevice corrosion can cause rapid failure of strand wires as well as a reduction of the pH in the corrosion cell area. The epoxy coating has good overall chemical resistance, but can be attacked by oxidizing materials such as chlorine, fluorine, and hypochlorite materials. Sodium hypochlorite is commonly used as a water treatment additive and for bleaching in the pulp and paper industries. The hypochlorite ion may also be formed in alkaline environments (such as concrete) when chloride ions or chlorine is present.

Construction of precast members using epoxy coated strand requires the use of special jaws on the strand during the tensioning process. Even with the special jaws, slippage sometimes occurs, causing removal of the epoxy coating and adding difficulty to the construction of the precast members. Jaws that are typically reused 60–70 times for bare strand often require cleaning after only two or three uses with epoxy coated strand.

It is common practice for post tension cables to be encased with hydrocarbon greases and sheathed with a polymeric coating that excludes oxygen. Strand and wire rope products filled with grease are typically limited to applications where high bond strength is not required (post tension applications) and bridges. Grease has been shown to offer good corrosion protection when present in excess; however, bare areas can occur due to rubbing. Greases may be expelled during periods of high temperatures, and many oils and greases become acidic with the passage of time, increasing the threat of corrosion. This acidic condition speeds the ionic exchange between the surrounding electrolyte and the metal substrate. The grouting of strand tendons can lead to air pockets or voids between the tendons where corrosive materials can collect. Some admixtures commonly used in grout formulations are corrosive with respect to steel reinforcement.

The interstices between the individual wires that form cables or strands frequently show the first place of attack. A paper in 1985 described the process of a bio-film community as follows: (1) iron-oxidizing bacteria infiltrate metal surfaces and put down "roots" to anchor a community; (2) slime formers and fungi are attracted to this site because of the nutrient availability and/or protection; (3) sulfate reducing bacteria thrive in this anaerobic layer producing copious amounts of corrosive hydrogen sulfide gas; (4) a layered aerobic/anaerobic stratification forms typically with the first layer of bio-film protecting an underlying anaerobic community.

Electromotive corrosion, like crevice corrosion, is also an accelerated form of corrosion which may be due to stray electrical currents from nearby cathodic protection systems or to static electrical currents generated from frictional contact as for example, between automobile tires and driving surfaces, as well as gear and bearing friction (and subsequently discharged through the automotive parking brake cables).

Many different types of corrosive environments exist: Marine, Rust Belt, Water Treatment Facilities, Power Plants, Pulp and Paper Mills, and Chemical Process Plants. Natural corrosives such as salts from marine environments, and man-made corrosives such as acid pollutants, corrode infrastructures and metal products. Structures requiring protection from corrosive constituents include roads, bridges, dams, parking garages, and piers. In that regard, people everywhere are increasing demands for snow and ice free roads, bridges, and parking garages through the use of deicing salts; unfortunately, these salts further contribute to the deterioration of infrastructure. Metal products requiring protection from corrosion constituents include metal parts of boats and marine equipment, automobiles and aircraft.

Considerable effort has been expended by the construction and automobile industries, among others, to delay and reduce the rate of corrosion of steel. Such corrosion can result in failure not only of the steel, but also the elements and structures the steel supports. For example, corrosion of reinforcing steel members in concrete is known to result in deterioration of the concrete. Such deterioration is believed to be due in large part to the fact that the corrosion products tend to occupy a greater volume of space than the original steel, resulting in stresses on the surrounding concrete material. Structural distress may also occur due to a reduced cross-sectional area of the steel or to a loss of bond between the steel and the concrete.

In industrial applications, metal corrosion can be accelerated by several factors such as the infiltration of oxygen and moisture ("general corrosion") and the presence of stray electrical currents ("electromotive corrosion"). Metal corrosion can also be accelerated by bacterial attack in highly acidic (i.e., pH<2.0), anaerobic environments on the metal surface ("microbiological induced corrosion").

One well-known method for preventing steel corrosion is galvanization. In particular, zinc and zinc alloys together with thermoplastic coverings are commonly used to coat strands and wire rope in many industries. Zinc and its alloys are known to protect the surface of steel sacrificially, in that zinc corrodes preferentially to steel. However, a major disadvantage of this treatment is that the zinc coating provides only temporary protection of the base metal. Also, the coating may corrode unevenly, jeopardizing the integrity of the underlying metal. Zinc electroplating processes used to galvanize ferrous substrates often lead to hydrogen embrittlement of steel products, notably the high strength, highly stressed steels. In addition, the corrosion of any galvanic zinc coating (electroplate, mechanical plate, cladding, thermal spray, hot dip, or zinc filled coating) can cause hydrogen embrittlement of high strength, highly stressed steels such as reinforcing strand used in concrete and bridge stays.

For the above reasons, many industries have begun to investigate alternative corrosion treatments. For example, most such treatments which have been developed for wire products involve coating or encapsulating the base metal with various compounds such as plastics, ceramics, epoxy resins, greases, and other hydrocarbon-based substances. These substances may be applied either on the outside of the wire ropes or strands or in the interstices of the ropes or strands. However, these treatments only provide a physical barrier to corrosive elements such as moisture and oxygen, and they do not address the corrosion of the steel itself. Furthermore, even with such applications, the steel is still vulnerable to crevice corrosion, since highly acidic, anaerobic environments will often appear on the metal surface, thereby promoting bacterial attack.

Current industry standards for corrosion prevention center around the use of heavy metals (chromium, nickel, lead, cadmium, copper, mercury, barium, etc.) or heavy metal compounds to passivate or provide a barrier to inhibit, or galvanically sacrifice, and thereby protect the substrate metal beneath. The introduction of these materials into the environment, however, can lead to serious health consequences as well as substantial costs to contain or separate the materials or clean up environmental contamination. Dealing with corrosion, accordingly, is a continuing problem and better systems for preventing corrosion are still needed.

SUMMARY OF THE INVENTION

The present invention in a broad aspect resides in a system and method for inhibiting the corrosion of ferrous and other metals by passivating the metals. The invention in one general aspect resides in compositions in various forms which are applied to a metal. The compositions comprise at least one layer that is formed of a carrier component in which a buffer is dispersed. The carrier component has a hydrophobic, or liquid water repellant, characteristic but is water vapor permeable. One or more pH buffer components are dispersed in relatively high concentration in the carrier component. The buffer component leaches out of the carrier to perform its passivating function over long periods of time, but only if moisture is present and in accordance with the extent of moisture present. Hence, the coating is a smart, or intelligent, material. The coating can react to change in the environment, and adapt to the change. It can lie dormant until it detects the first stages of corrosion, which is the presence of moisture. Then, the coating reacts to inhibit the corrosion process. Moreover, it inhibits corrosion while being in harmony with nature.

The coating of this invention is in intimate contact with the metal surface it is designed to protect. Since our coating is hydrophobic, it is repellent to liquid water. Accordingly, it inhibits the flow of liquid water to the metal surface. On the other hand, since our coating is water vapor permeable, water vapor can migrate to and from the metal surface. Thus, moisture can reach the metal surface, but on a controlled basis. The importance of this feature will hereinafter be more fully described.

In a preferred example of this invention, our coating has a semipermeable thickness contiguous the metal surface to be protected, a buffer reservoir thickness (preferably spaced from that surface by the semipermeable thickness), and a liquid water repellent/mechanical protection thickness covering the reservoir thickness. All of these thicknesses are water vapor permeable but preferably water resistant, if not water insoluble. In dry film examples of our preferred invention, each such thickness is present in our coating, and is provided by a separate layer. In other examples of this invention, the three thicknesses mentioned can be provided with a single layer, such as a gel of significant thickness. In other dry film examples of the invention, only a buffer reservoir layer and perhaps the semipermeable layer might be needed.

If our coating is in the form of a gel, the continuous phase of the gel should repel liquid water and penetrate into and/or spread easily over the metal surface to be protected. In other words, it should be capable of being easily shaped, spread, or molded and also wet the metal surface easily. In wetting the metal surface, the molecules of the gel would appear to have a significant attraction to the metal surface, as compared to their attraction to each other.

On the other hand, the gel should be water vapor permeable. When the gel is applied as protection to a metal surface, we believe that a small thickness of the gel immediately contiguous the metal surface becomes reduced in buffer content and provides a semipermeable thickness contiguous the metal surface. Thickness portions of the gel above that small thickness serve as a reservoir thickness. Liquid water erosion and mechanical protection over the reservoir thickness of the gel is provided by providing an additional thickness of the gel. Since all of the gel thicknesses originally contain a buffer component, very long term corrosion protection can be afforded.

The buffer may be particulate or liquid in form but is soluble or otherwise ionizable in water, and is selected to retain the proximity of the metal surface at a pH at which the metal is passive to corrosion. By liquid in form, we ordinarily mean that the buffer component is dissolved in the carrier resin, or first dissolved in its own carrier and then dispersed in the carrier resin. In a water-based resin carrier, for example, an aqueous buffer solution may be miscible. However, it may be immiscible, and form an emulsion with the carrier, in which very small droplets of buffer solution are dispersed in the carrier resin as a second phase. This is acceptable, and in some cases preferred. Generally, buffer in liquid form, or in the form of very fine particles, is preferred where a smoother coating is desired. The foregoing discussion is primarily applicable to the dry film embodiments of our invention but has applicability to other embodiments. For gels, however, we would prefer to use very fine particles, usually less than 20 $\mu M$.

We recognize that a liquid buffer in the carrier of the coating eventually may dry and form fine solid particles dispersed in the carrier resin. Whether solid or liquid in form, the buffer can leach out of the carrier over time to provide its passivating effect. It can do this because the carrier is semipermeable. This means it is permeable to water molecules, i.e., water vapor, and buffer ions. Whether originally in particulate or liquid form, after leaching out of the carrier, the environment of the coating may dry. In this instance, the buffer may solidify or dry while contacting the surface of the metal it is to protect. However, the solidified or dried buffer should remain ionizable and capable of redissolving when subsequently exposed to moisture in the coating. We believe the buffer particles of this invention that have been dissolved are usually smaller upon drying than the buffer particles originally used in the carrier. Hence, use of a dispersed aqueous buffer solution, rather than buffer in particulate form, may be preferred in the carrier resin for dry film coatings of our invention. This will allow our dry film coatings to have a smoother appearance, and be essentially clear and colorless. Such characteristics not only impart corrosion resistance to the metal surface being protected, but makes that surface readily paintable. This alone makes our coating attractive. However, since our coating is preferably made with water based, i.e., water borne, resins, it is compatible with water-based paints. Accordingly, our coating can be painted with paints that do not involve organic solvents (VOCs). This makes our coating even more attractive from manufacturing and environmental standpoints.

We further believe that the amount of buffer we employ in our coating carrier, can result in a matrix or network in the coating that extends between its opposed surfaces. Hence, upon drying of the coating, and presumably of any liquid form buffer, a water vapor and ionic path through the carrier is formed, even if the coating carrier material is not essentially semipermeable to water vapor and ions. If particles of buffer are used in the coating carrier, the buffer particles preferably range in size in order to dissolve over extended periods of time and thereby provide a continuing buffering function.

As indicated above, the carrier may take various preferred forms such as films, gels, sealants, etc., depending on such factors as the type, configuration and service of the metal that is to be protected. The carrier may also vary in its physical and chemical nature, again depending on various factors. In general, the carrier should be at least water resistant, if not water insoluble. However, it has to be water vapor permeable. These carrier characteristics provide several important features to our invention. Effectively, these characteristics limit the quantity of water molecules that reach the metal surface. The resulting small quantity can readily be buffered with a correspondingly small quantity of buffer. In other words, the carrier may pick up some water from its ambient but it will saturate at a relatively small water content, and establish an equilibrium with moisture migrating to the metal surface.

In addition, the above-mentioned characteristics of the carrier encase the metal surface being protected, to limit the loss of buffer from the buffer reservoir and from the metal surface being protected. Hence, buffer ions are not readily lost from the metal surface. Thus, buffer ions do not need extensive replacement, and a smaller amount of buffer in the carrier can still provide lengthy corrosion protection.

The carrier must be water vapor permeable, especially when our coating is in the form of a thin dry film adhering to the metal surface. Water vapor permeability is needed to prevent water vapor pressure build up adjacent the metal surface. The water vapor pressure build up can separate the film from the metal surface. Such separation can at least increase the volume of liquid water accumulating at the metal surface. In more severe cases, the coating can open, which can allow loss of buffered water from the buffer reservoir and from the metal surface. These effects would at least deplete the buffer reservoir sooner, especially if buffered moisture is washed away from the metal surface. Hence, corrosion protection is lost sooner.

The encasement of the metal surface by our coating is thus very important to obtaining longer term corrosion protection. It limits the amount of moisture reaching the surface to be protected, so that a smaller amount of buffer can raise pH to the desired level. In addition, our coating inhibits loss of buffer from the surface being protected. The gel coating has an additional feature in that it is compliant or flexible. If separation would happen to occur due to water vapor pressure buildup, the coating can move without rupture. When the environment dries out again, the coating can move back to its original position contiguous the metal surface, thus limiting the volume of water reaching the metal surface the next time moisture occurs. Hence, a gel has a self-accommodating and a self-healing effect.

Generally, the mixture of the carrier and the buffer should be sufficiently viscous when applied that the buffer will remain uniformly dispersed within the carrier after application. This is, of course, more applicable to gels than to coatings that are dried or hardened after they are applied.

It is to be understood that the coatings of this invention can include components capable of inhibiting the corrosion of any given metal in the presence of moisture or other sources of corrosion promoters. The inhibitor components co-act with the buffer components to provide protection against corrosion and may be specifically chosen to inhibit microbiological growth. They can be included with the buffer, or be present in one or more layers used in combination with a buffer-containing layer. On the other hand they can be provided in an additional layer that is especially designed to supply and support the corrosion inhibitor.

From the foregoing it becomes apparent that the invention provides an intelligent corrosion inhibiting system that not only passivates a metal facing corrosion, but also maintains such protection over extended periods of time. The system does this by providing a protected source of buffer, and a protected buffered environment at the surface of the metal being protected. Corrosion protection, accordingly, is not limited to the use of reactive metals or barrier films traditionally employed in corrosion preventative coatings.

In addition, it should be stressed that an important feature of the invention resides in its environmentally friendly nature and the "green" protection it provides. The invention purposely minimizes and preferably avoids use of heavy metal-type corrosion preventives or other preventives that may contaminate an application site or be introduced to the surrounding environment. Yet, it affords long term corrosion protection.

The intelligent nature of the systems of the invention is abetted by a choice of carriers and by specific layering of the thicknesses hereinbefore mentioned. Thus, as previously noted, the carrier may take the form of a gel, film, sealant, adhesive or other suitable medium. Further, one or more layers of a single coating medium may be applied to a metal. Alternatively, our coating can take the form of a plurality of layers, in which each layer is designed for a specific function, as for example the first layer may be designed to wet the metal surface well and to be highly permeable to water vapor and ions. The reservoir layer may be designed to accept high loadings of particulate buffer and be highly repellent to liquid water, while still being permeable to water vapor. A top layer might provide protection against liquid water and mechanical erosion but still be water vapor permeable. Still other internal or external layers could be used to serve as barriers for corrosive materials such as air, carbon dioxide, chloride ions, etc.

The present invention is directed to (1) novel buffered compositions which may be applied to metal products for preventing or retarding corrosion; (2) methods for applying the buffered compositions to metal products, for example wire cables, such that corrosion-protection of the products is achieved through passivation; and (3) systems for in situ application to existing structures with metal reinforcement.

The compositions of the invention thus reside in a corrosion or rust preventive coating which includes a carrier in which is dispersed a buffer that serves to maintain a protective influence over the metal being coated. In a preferred form, protection of a metal surface is afforded by providing a pH on that surface which is in a range of pH values wherein the metal has a natural passivity to corrosion. The carrier is in a form suitable for application to the metal for a long term or generally permanent basis. However, for gel application to wire rope, the gel may be reapplied in service as needed. Thus, following application to a metal surface, the carrier is preferably selected to adhere, to the metal surface as an adhesive or gel or to be immobile or cured so as to remain on the surface.

The buffer component may be in the form of particles which preferably range in size from fine to coarse in order to provide a buffering function which is both prompt and enduring. Particle sizes thus may typically range from about 0.5 $\mu M$ to 850 $\mu M$, and preferably about 0.5 $\mu M$ to 500 $\mu M$. Particle size distribution may vary from case to case, depending on the atmosphere or environment in which the corrosion preventive must serve. In general, it appears that a preferred distribution for most applications is 0.5 $\mu M$ to 500 $\mu M$. However, for some wire rope applications, the recommended particle size is less than 20 $\mu M$. It is to be understood that gels in general are often formed with dispersions of particles of about 1 $\mu M$ or less, which are colloidal size particles. In some cases we may prefer to form our gels primarily with such small particles. In addition, a buffer component may be dissolved in solution, preferably an aqueous solution, and applied to the metal surface to be protected. After application to the metal surface, the buffer component may dry or return to solid form, but should be readily capable of redissolving in the presence of corrosive liquid.

The concentration of buffer in any given carrier, i.e., buffer loading in the film or layer, preferably should be the maximum consistent with ease of handling and the stability of the overall composition. In general, we would prefer to form a matrix of buffer in the carrier layer, if the resulting coating material is practical to use. Hence, we prefer buffer concentrations or proportions in the buffer reservoir layer of at least about 20%, by weight, preferably 30%–40%, by weight, and even up to 45% by weight. Buffer proportions in the reservoir layer of 45%–60%, by weight, may be useful in some instances, but generally will provide a mixture that is either too viscous, or too quickly hardening. Use of such high buffer loadings or proportions is not known to be practical above 60% by weight. However, it is conceivable that new polymer systems may allow higher buffer loadings to be useful. The function of buffers is well-known in that buffer solutions act to minimize changes in hydrogen ion concentration (pH) which would otherwise tend to occur as a result of chemical reactions. once formulated, these solutions tend to resist further change due to outside influence. This makes it possible to tailor buffer response so as to resist pH changes caused by changes in temperature, pressure, volume, redox potential or acidity, etc.

Buffer solutions are typically prepared by mixing a weak acid and its salt or a weak base and its salt. Acidic buffers, for example, can be prepared using potassium chloride or potassium hydrogen phthalate with hydrochloric acid of appropriate concentrations. Neutral buffers can be prepared by mixing potassium dihydrogen phosphate and sodium hydroxide, for example. Alkaline (basic) buffers can be prepared by mixing borax or disodium hydrogen phosphate with sodium hydroxide, for example. Many more chemical combinations are possible, using appropriate chemicals to establish the proper sequence of proton transfer steps coupled with the intended reactions. Buffer exchange rates may be modified by combinations of buffer materials that react at different ionic exchange rates; buffers of low-change type react more rapidly than high-change types.

As noted above, the buffer compositions of the invention serve to keep the pH of the carrier in contact with a metal at a value at which the metal has a natural passivity toward corrosion. In the case of iron, steel, and other iron alloys such as stainless steel and monel alloy, the pH at which such materials have a natural passivity toward corrosion is in the range between about 8 and 13. In the case of aluminum and aluminum alloys, the range is between about 5 and 7. In the case of bronzes, the range is more often between about 7 and 10. In general, most metals suitable for use with the present invention are naturally passive to corrosion at pH values above about 3.0.

Materials that may serve as buffers in any given instance may vary considerably, depending on the pH at which the metal at hand has a natural passivity toward corrosion. Well-known buffers include alkali metal or alkali metal hydrogen tartrates, tetroxalates, phosphates, phthalates, borates, and the like, wherein the alkali metal is preferably sodium or potassium. Another commonly used buffer is calcium hydroxide. Preferred buffers include sodium and potassium silicates, and especially mixtures of such silicates, which include water of hydration. The buffer in any case should comprise particles in anhydrous or hydrated form or dissolved in solution, preferably aqueous solution. In general, the hydrated form of any given buffer is preferred over the anhydrous because of its more ready solubility in water. The hydrated buffer also is preferred because its water of hydration may keep buffered water molecules present at all times adjacent the metal surface being protected, even if the ambient is relatively dry. Hence, essentially continuous passivation protection by pH control is provided even during low ambient moisture conditions. In such instance, corrosion protection would be obtained by maintaining the metal surface moist, not dry. This is, of course, contrary to prior popular opinions.

The invention in one broad aspect may be considered as a macro-infiltrated, micro-laminated system in that high concentrations of a pH buffer are incorporated in a carrier or vehicle, and the buffer-loaded carrier or vehicle is preferably applied to a metal product among a plurality of thin layers. When the particulate form of buffer is used, as noted earlier, the buffer particles are preferably present in a range of particle sizes so as to become active as buffers over an extended period of time.

When applied as films, the corrosion preventive compositions of the invention are preferably applied in a macro-infiltrated, micro-laminated form. As indicated above, the carrier protects the metal surface from excessive leaching away of the buffer ions from the metal surface. What buffer ions need to be replaced, leach out of the carrier over time as needed in response to corrosive liquids that migrate to the metal surface. The inner layers typically comprise multiple thin layers of a carrier laden with liquid buffers or particulate buffers of varying particle size to impart an additional self-activating, time-release buffering action.

One or more intermediate layers may serve as barrier layers of one sort or another for the underlying buffer layers. One may chose to add a hydrophobic layer, so long as it is water vapor permeable. Additional water and/or mechanical erosion protection layers can be used.

The intermediate barrier layers may be coated with one or more layers which have sealant or water-repellant properties. A carrier macro-infiltrated with aluminum silicate particles, for example, forms layers with strong hydrophobic qualities. The carrier in this instance may be a polymeric material such as polyacrylic, silicone, polyurethane, epoxy, vinyl polymer or polyvinylacetate.

The present invention has particular application in protecting cables and wire ropes which are made of multiple strands of wire. In this latter application, it is generally preferred that the compositions of the invention be in the form of a viscous jelly-like carrier macro-infiltrated with one or more particulate buffers. The product preferably resembles a thixotropic gel which tends to become fluid under shear, but sets up to a relatively firm structure. The thixotropic nature renders desirable physical properties to the composition. However, a thixotropic nature is not necessarily required. The gel may be applied to individual strands during fabrication of a rope or cable, but it may also be injected into and along a rope or cable following fabrication. Thixotropic properties of the gel enable the buffer composition to flow along the interstices between and surrounding the strands which form the rope or cable. The thixotropic properties also enable the material to take a much more permanent position once injected into a rope or cable, thereby providing long term protection.

As noted earlier, wire rope and cable are especially subject to crevice corrosion. The present invention by its gel formulations is especially effective in dealing with such corrosion. Particularly effective are formulations which include not only a buffer such as an alkali metal silicate but also a bactericide and/or fungicide, preferably a metal borate, such as zinc borate.

This invention is also very effective in protecting and rehabilitating existing infrastructures through the use of a pumpable thixotropic composition that is applied into existing cracks of a supporting concrete structure. The composition reacts to changes in the environment that are conducive to corrosion and releases buffers to change the pH of the site surrounding rebars or other metal structures to be protected. When a tendency for pH drop is encountered, the reactive components of the composition work to passivate the surface of the metal. One can add an agent to the smart layer, i.e., the layer containing the buffer, to complex with, precipitate or otherwise actively tie up any chloride ions that accelerate corrosion. Once the composition is pumped into a structure, its thixotropic nature is activated and it tends to prevent physical ingress of liquid water. By raising the existing pH of the corrosion site, corrosion that is already taking place is countered and further corrosion reduced or eliminated.

DETAILED DESCRIPTION OF THE INVENTION

The present invention in a broad aspect resides in an intelligent corrosion inhibiting system that passivates the material to be protected and provides long term protection by maintaining a buffered environment via solubility of buffering compounds such that corrosion is not likely to occur. Although the invention may be used to supplement and boost the performance of sacrificial coatings and platings, the system of the invention is not dependent on any reactive metals or barrier films traditionally found in corrosion preventative coatings. Indeed, an important aspect of this invention lies in its environmentally friendly nature and the "green" protection it provides.

The method or system of the invention for preventing corrosion can be readily implemented using gels, coatings, films, sealants, adhesives, or the like as carriers for a buffering material. Appropriate buffer materials are chosen such that, when contacted by water vapor, they dissolve and migrate to the proximity of the metal substrate surface with the water vapor. At the metal substrate surface, the buffer and water vapor produce a pre-selected pH range that imparts natural passivity to the surface of that metal substrate. It should be appreciated that buffering will resist changes in pH away from the passive range of the substrate and thereby resist potential corrosion. A significant feature of this invention is that buffering occurs in a very thin layer of moisture adjacent, and in many cases contiguous, the substrate surface. The layer of moisture is believed to be less than about 200 $\mu M$ thick, and probably of the order of 50 $\mu M$ or less. Moreover, this thin layer of buffered moisture is isolated. It is retained in place, and protected from the ambient by a large thickness of water repellent gel or sealant, or by a relatively large thickness of water repellent covering layers. Because the isolated layer of buffered moisture is so thin, it does not need as many moles, or as large a fraction of a mole, of buffer ions to raise its pH to the desired passivating level. Because the thin buffered layer of moisture is isolated, buffer ions are not readily lost. Hence, they do not need extensive replacement over time from the buffer reservoir layer. Buffer dissolution and migration out of its water repellant carrier (in the buffer reservoir layer) is controlled by a concentration gradient between the buffer reservoir layer and the isolated thin layer of moisture at the metal surface. This feature adds an intelligent characteristic to the coating system, whereby if the moisture in the proximity of the substrate contains sufficient buffer materials, the rate of dissolution and migration of the buffers from the carrier to the substrate surface decreases. It is recognized that dissolution and migration to the outer surface of the buffer-containing layer can occur as well. For applications where significant moisture exposure is not present, or extreme long term protection is not needed, some outward migration of buffer may not be of concern. If it is, such migration can be reduced by covering the buffer layer with a liquid water resistant coating. In fact, we prefer to use such a coating in most instances. It not only reduces the outward migration of buffer ions by dissolution into liquid water on the outer surface of the coating but also provides mechanical and water erosion protection of the buffer-containing layer as well. In addition, or in the alternative, the buffer-containing layer can also be made thicker, to provide a higher volume of buffer ions. Film coatings are ordinarily used in a total thickness of only about one mil, with some applications using up to 50 mils of total film thickness. In this connection gels have an advantage. Gels are ordinarily used in thicknesses of about $\frac{1}{16}-\frac{1}{2}$ inch. In some applications, even greater thicknesses might be used, as for example where a concrete crevice is filled with gel, or where a metal cable sheath is filled with gel. In such instance the buffer carrier thickness may contain 1000–5000 times the number of moles needed to replace the entirety of the ions originally needed to buffer the metal surface. For example in a gel, we would prefer to use a thickness that would provide at least 2000 times the number of moles needed to form the initial buffer layer at the metal surface.

Still further, with additional buffer ions being stored in the liquid water repellant reservoir layer, the additional buffer ions are protected from rapid dissolution even if exposed to liquid water. Hence, they remain in place more effectively to resupply the thin layer of moisture adjacent the metal surface being protected. Another thought is that migration of the buffer ions to the metal surface through a semipermeable barrier adjacent that surface provides a time release feature to the protection. A further time release feature may be obtained with a particulate buffer having particles of varying size dispersed in the carrier for the buffer. A time release feature may analogously be obtained with a liquid buffer which is applied over a semipermeable layer, dried and then embedded in a carrier and/or covered with a liquid water repellent layer. Small particles dissolve completely for short duration protection, while larger particles require a longer time frame to completely dissolve and offer longer duration protection. As noted earlier, the compositions of the invention may be employed in many forms especially films, coatings, gels, sealants and adhesives. Each of these forms is discussed below.

Film Coatings

The buffer technology of the invention may be incorporated in dry film coatings to produce a smart, macro-infiltrated, micro-laminated coating system. A wide variety of polymers can be used for such dry films, as noted elsewhere herein. We refer to such films as dry films because they are dry to the touch and can even be painted with a relatively durable covering coating. Such films are preferably applied in thicknesses of about 0.2–0.4 mil per film or layer, especially for polyurethane films. Ordinarily, the first 0.2–0.4 mil thick film or layer that is applied contains no loading of buffer. For example, it would be solely a 0.2–0.4 mil thick polyurethane layer with no buffer. A 0.2–0.4 mil thick polyurethane film with a high loading (e.g., 20%–60% by weight of the polyurethane film) of buffer dispersed in it is disposed on the first applied film. A third 0.2–0.4 mil thick film of polyurethane is applied over the buffer containing film. This third applied film is preferably water repellent. Hence, it preferably contains no buffers or other soluble additives that can impair its water repellent integrity.

This coating system provides a unique corrosion protection to the substrate metal via time release of buffer materials. It can even protect by such action when the coating system is compromised by damage and moisture is present. The coating system does not require, and preferably excludes, the use of environmentally undesirable heavy metals in elemental or non-elemental form. The coating system includes one or more coating layers which are micro-infiltrated with solid, particulate, buffer materials or liquid buffer materials. The buffer materials may be added to water borne resin systems and solvent borne resin systems as long as they are compatible. Aqueous polymers are preferred carriers for buffers in liquid form and include water-reducible alkyds and modified alkyds, acrylic latexes, acrylic epoxy hybrids, water reducible epoxies, polyurethane dispersions, vinyls and ethylene vinyl acetates. Such polymers are water vapor permeable but are repellent of liquid water and are essentially water insoluble after curing. Nonetheless, they form a semipermeable membrane for water vapor and ionic transfer. Hence, if the surface of the metal substrate is dry, water vapor can reach it. However, so can the buffering ions that passivate that surface from corrosion.

The buffer materials are generally unaffected by the curing methods and may be used in resin systems which cure via air dry, heat, chemical cross-linking, ultra-violet, and other curing mechanisms. These buffer materials may be added in particulate form or dissolved in a solution, preferably an aqueous solution. The particulate buffer materials may be added into the coating systems in a range of particle sizes to achieve an enhanced time release feature. In loadings of about 30% or more by weight, the particles can form a matrix within the carrier. Also, buffer materials applied in dissolved form can form a buffer network or matrix within the carrier, and have a time release feature.

It is to be noted that even if our protective coating is not perfectly conformal with a surface to be protected, significant corrosion protection can still be obtained. For example, there could be crevice areas under the coating that are isolated but not in intimate contact with the coating of our invention. In such instance, moisture can accumulate in the crevice areas. However, it is limited in amount, and is readily adjusted in pH by outward migration of buffer from the buffer reservoir layer. In addition, this buffered moisture is trapped in the crevice, so that the buffer ions are not readily lost. Hence, even the crevice areas are passivated by our coating.

Analogously, our protective coating can still passivate even if it has a damaged protective layer, or protective thickness. If the protective outer surface of our coating has been damaged, it still can protect the metal surface from corrosion. However, the length of protection may be decreased. For example, if just the protective outer thickness is damaged, the buffer reservoir layer can be exposed to liquid water. When so exposed, buffer material can leach out to the ambient and be lost, thus reducing the buffer supply that may later be needed for pH adjustment. In another example, the buffer layer could be is damaged as well, as for example by a scratch that also exposes the metal surface. In this latter instance, when our damaged coating is exposed to moisture, buffers in the buffer reservoir begin to dissolve and migrate laterally out of the edges of the buffer reservoir layer exposed by the scratch. The buffers migrate to proximity of the metal substrate surface to be protected and adjust pH there to the desired level. In such instance, smaller buffer particulates dissolve more quickly and offer rapid buffering for a shorter duration. Larger particulates require more time to completely dissolve, thus offering a longer protection duration and time release feature. In these last examples, the rate of dissolution of the buffer materials is dependent on the concentration. gradient of the buffer materials between the interior of the buffer reservoir and the damaged area. Thus, when moisture first enters the proximity of the damaged coating, dissolution and migration of the buffer materials occur. As the concentration of buffer materials outside the coating increases, the rate of dissolution and migration of buffers from the buffer reservoir decreases. If the outside water is contained in some way, and is not large in volume, the dissolution of buffer and outward migration can come to equilibrium, and no net buffer quantity would be lost from the reservoir layer. However, if the buffers outside the buffer reservoir are washed away, or the water volume is extensive, more buffer from the buffer reservoir continues to dissolve and migrate to the outside of the coating.

From the foregoing, it is conceivable that a dry film coating, such as a polyurethane film containing 20–60% by weight buffer, could provide a measure of corrosion protection all by itself. For example, a dry film buffer reservoir layer could be disposed in a protected environment such as on an electrical wire under electrical insulation, or on a ferrous metal cable that is covered with a close fitting waterproof sheath. In such instance, a water repellant dry film overlayer on the buffer reservoir layer might provide best corrosion resistance, However, adequate but lesser, corrosion resistance might be obtained without it, since the outer ambient is a close fitting and fairly contained ambient. Analogously, in such examples, one might be able to get some meaningful measure of corrosion protection even without an underlying semipermeable dry film layer. The reason is that if the buffer reservoir layer cracks and/or separates from the wire or cable, the close fitting insulation or sheath may keep it in place. If so, it may be retained in place well enough to provide a measure of corrosion protection. The protection would probably be less than in our preferred example but may be adequate for a given application that requires less corrosion protection. One can consider that such examples bear a resemblance to other examples mentioned herein in which a protective gel fills a housing or sheath that encloses a wire cable or rope. It differs in that in the latter examples, a significant thickness of the gel is used.

Buffer materials are chosen based on the type of substrate to be protected. Metal substrates may be protected from corrosion by passivating the substrate surface. This passivation may generally be accomplished only in certain pH ranges which, in turn, depend on the specific substrate to be protected. For example, iron based alloys are passivated with an alkaline pH (pH 8–12). This pH range is preferably accomplished with sodium silicate and/or potassium silicate powders, but other alkaline materials may be used. A blend of sodium and potassium silicates is especially useful for achieving viscosity control in aqueous base formulations.

Potassium silicate powder materials may also be incorporated as an insolubilizer in a secondary layering outside of the primary buffer layering. Such materials react with carbon dioxide to form an insoluble film which protects the primary buffer layering from premature dissolution. An outer, tertiary, water repellant layer macro-infiltrated with aluminum silicate may be used to impart hydrophobicity to the coating system. Aluminum silicate is largely insoluble in water.

In a preferred embodiment of the invention, buffered films or layers are employed with barrier layers which overlay the buffered layers, and also with outer, water repellant layers which overlay the barrier layers.

All of the layers are infiltrated with particles or with liquid to form a macro-infiltrated, micro-laminated coating system. The inner most layers comprise appropriately chosen buffer materials to impart a smart, time-release buffering to achieve surface passivation of the substrate metal. An intermediate coating layer acts as a barrier to protect the buffering layers. A top layer comprises a polymeric film macro-infiltrated with a aluminum silicate or other materials to achieve hydrophobicity (water repellence). In addition, various pigments and corrosion inhibitors may be incorporated into these coatings. Where desired, these coatings can contain sacrificial metals or be applied over a basecoat containing elemental or non-elemental metals or conversion coatings, such as a zinc plating with or without a chromate conversion coating. The corrosion protection already afforded metals by traditional zinc or zinc alloy platings over metals, with or without chromates, receive a significant boost and reinforcement in corrosion protection with the coatings of this invention, and particularly with such coatings comprising sodium silicate buffers. More significantly, the coatings of this invention may be applied over phosphate treated surfaces, particularly zinc phosphate, iron phosphate, and manganese phosphate, which may be substituted effectively for environmentally unfriendly chromates to provide "greener" corrosion protection. Thus, for such applications, the macro-infiltrated, micro-laminated system offers the possibility of eliminating the toxic and environmentally unfriendly chromates without sacrificing protection against corrosion.

Applications for the films and coatings of the invention include, for example, components for the automotive industry, home-consumer products, construction and infrastructures, aerospace industry components, and other out-door or corrosive applications where the use of heavy metals in elemental or non-elemental form is environmentally undesirable. The films and coatings may be applied to new products or over conventional platings to extend the useful service life of the plated component.

Gels

These are suspensions in which a dispersed phase of buffer agent, preferably in particulate form, is combined with a continuous phase to produce a viscous jelly-like product. In the instant invention a synthetic oil is preferably used for the continuous phase. The buffer system is added to provide protection specific for the application.

Gels exists in a state somewhere between liquid and solid and can be tailored to act like either one or the other. Thixotropic gels allow application at a state approaching liquid for ease of insertion into cracks and subsequent return to solid nature to physically resist liquid water intrusion. The buffered gels of the invention form an excellent vehicle of transport for attacking corrosion sites that have developed within a surrounding concrete envelope. The gels and their chemicals can reach deep into the structure and then be localized to passivate a metal (steel) surface. Any chloride ions introduced into the concrete can be chemically bound by reactive components of the gel, and deterioration of the structure and reinforcing steel thereby arrested.

Thixotropic gels employing synthetic oils as a continuous phase or carrier have proven effective in practice of the invention. Examples of synthetic oils include oils based on synthesized hydrocarbon fluids, alkyl benzenes, dibasic acid esters, polyol esters, polyglycols, olefin oligomers, polybutenes, cycloaliphatics, silicones, phosphate esters, polyphenyl ethers, and halogenated fluids. These fluids can be tailored to have a controlled molecular structure which exhibits the best properties of a petroleum based (mineral oil) system as well as properties not found in hydrocarbon greases. Petroleum hydrocarbon greases fail at temperatures approaching 350° F., while some synthetics maintain excellent properties up to 800° F.

Gels formed with the above synthetic fluids may be filled with many different buffers, preferably particulate buffers, and special components such as barrier materials and corrosion inhibitors. Attractive gels have been filled with sodium silicate, potassium silicate, and zinc borate in amounts of about ten percent by volume each, totaling about 30 percent by volume and generally 30% by weight.

An especially applicable synthetic gel is based on a synthetic polyolefin fluid (alpha decene) available under the trademark NYOGEL® from William F. Nye Inc. We refer to such materials a polyalphaolefin base oils. Specific formulations have included ten percent by volume each of sodium silicate, potassium silicate and zinc borate. Silver nitrate may be added in high chloride ion environments. In our most recent tests we prefer to include a small amount of P-hydroxy aniline along with an indigo dye.

Applications for the gels of the invention include:
1. Wire rope used in aircraft, marine, mining, automotive, oilfield, and transportation applications, both as a lubricant and for corrosion protection;
2. Strand used in construction such as prestressed cables and post tensioned cables in concrete, and bridge stays typically found in stay bridges, parking garages, ground anchors, concrete buildings, railroad ties, concrete aqueduct pipes, and water and chemical containment vessels;
3. Gels injected in cracks in concrete for rehabilitation purposes;
4. Sluice gates for water/chemical containers;
5. Anti-seize compounds;
6. Globe valves/gate valves in corrosive environments; and
7. Suspension bridge cables.

The gels may be applied to wire ropes, cables and strand during fabrication or in the field before or after the wire ropes, cables or strand are positioned for use.

Sealants

In this form, particulate agents are dispersed in an organic or synthetic substance that is formulated to be soft enough to pour or extrude, but is also capable of subsequent hardening to form a permanent flexible bond with a metal substrate. Typically, sealants are synthetic polymers such as silicones, urethanes, acrylics, polychloroprenes, or the like which are semisoluble before application and later become elastomeric. A few of the best known sealants are natural products such as linseed oil, putty, asphalt and various waxes. Addition of an appropriate buffer system of the invention acts to protect metallic structures from corrosion.

Applications for sealants of the invention include:
1. Household and industrial caulking employed to address weather or liquid water sealing needs typically created by lap joints of similar or dissimilar materials;
2. Ship building, automobile, and aircraft, which are additional examples of industries which create a myriad of metal lap joints resulting in potential crevice corrosion sites; and
3. Foamable sealants used in automobile and aircraft applications to fill voids, provide liquid water seals and to deaden sound.

Adhesives

In this form, the buffers of the invention may be dispersed in organic, inorganic and synthetic polymers that provide chemical and/or physical bonds between metal substrates for a strong joint, as opposed to sealants that remain pliable. Other suitable adhesive type carriers include rubber and latex based materials, as well as hot melt formulated from polyethylene, polyvinyl acetate, polyamides, hydrocarbon resins, and also natural asphalts, bitumens, resinous materials and waxes. These adhesive materials formulated with the appropriate buffer systems of the invention provide substrate protection from general corrosion, dissimilar metal corrosion, and crevice corrosion.

Applications for adhesives of the invention include any metal lap joints designed for adhesive bonding for new assemblies or repair.

Table A gives examples of suitable buffering components which may be used in accordance with the present invention, while Table B gives examples of suitable weight ratios of these buffering components for different pH values. Of course, other weak acid/conjugate base or weak base/conjugate acid systems may be used, provided they are compatible with the base carrier matrix.

TABLE A

Examples of Buffering Compounds

| Chemical Name | Formula |
|---|---|
| Boric Acid | $H_3BO_3$ |
| Citric Acid | $H_3C_6H_5O_7 \cdot H_2O$ |
| Sodium Hydroxide | NaOH |
| Trisodium Phosphate Dodecahydrate | $Na_3PO_4 \cdot 12H_2O$ |
| Potassium Silicate | $SiO_2/K_2O$ 1.6–2.5 wt. ratio |
| Sodium Silicate | $SiO_2/Na_2O$ 2.0–3.22 wt. ratio |
| Potassium Hydrogen Phthalate | $KHC_8O_4H_4$ |
| Potassium Dihydrogen Phosphate | $KH_2PO_4$ |
| Borax | $Na_2B_4O_7$ |
| Sodium Hydrogen Carbonate | $NaHCO_3$ |
| Disodium Phosphate Dodecahydrate | $Na_2HPO_4 \cdot 12H_2O$ |
| Sodium Acetate | $NaOOCCH_3$ |
| Disodium Phosphate | $Na_2HPO_4$ |

TABLE B

Examples of Weight Ratios of Buffering Components for Various pH Values

| Desired pH | Weight | Chemical | Weight | Chemical | Weight | Chemical |
|---|---|---|---|---|---|---|
| 3.0 | 1.00 | Boric Acid | 0.84 | Citric Acid | 0.18 | Trisodium Phosphate |
| 3.5 | 1.00 | Boric Acid | 0.84 | Citric Acid | .027 | Trisodium Phosphate |
| 4.0 | 1.00 | Sodium Hydroxide | 196.00 | Potassium | Hydrogen | Phthalate |
| 4.5 | 1.00 | Sodium Hydroxide | 29.30 | Potassium | Hydrogen | Phthalate |
| 5.0 | 1.00 | Sodium Hydroxide | 11.30 | Potassium | Hydrogen | Phthalate |
| 5.5 | 1.00 | Sodium Hydroxide | 6.97 | Potassium | Hydrogen | Phthalate |
| 6.0 | 1.00 | Sodium Hydroxide | 30.40 | Potassium | Dihydrogen | Phosphate |
| 6.5 | 1.00 | Sodium Hydroxide | 12.20 | Potassium | Dihydrogen | Phosphate |
| 7.0 | 1.00 | Sodium Hydroxide | 5.84 | Potassium | Dihydrogen | Phosphate |
| 7.5 | 1.00 | Sodium Hydroxide | 4.14 | Potassium | Dihydrogen | Phosphate |
| 8.0 | 1.00 | Sodium Hydroxide | 3.64 | Potassium | Dihydrogen | Phosphate |
| 8.5 | 1.00 | Boric Acid | 0.84 | Citric Acid | 4.80 | Trisodium Phosphate ($12H_2O$) |
| 9.0 | 1.00 | Boric Acid | 0.84 | Citric Acid | 5.82 | Trisodium Phosphate ($12H_2O$) |
| 9.5 | 1.00 | Sodium Hydroxide | 13.55 | Borax | | |
| 10.0 | 1.00 | Sodium Hydroxide | 6.52 | Borax | | |
| 10.5 | 1.00 | Sodium Hydroxide | 5.25 | Borax | | |
| 11.0 | 1.00 | Sodium Hydroxide | 2.31 | Sodium | Hydrogen | Carbonate |
| 11.5 | 1.00 | Sodium Hydroxide | 8.00 | Disodium | Acid Phosphate ($12H_2O$) | |
| 12.0 | 1.00 | Sodium Hydroxide | 1.30 | Disodium | Acid Phosphate ($12H_2O$) | |
| 12.5 | 1.00 | Sodium Hydroxide | 15.00 | Disodium | Acid Phosphate | |
| 13.0 | 1.00 | Sodium Hydroxide | 1.00 | Sodium | Acetate | |

For example, a buffering system comprising a 1.00/30.40 weight ratio of sodium hydroxide to potassium dihydrogen phosphate would be suitable for protecting aluminum and aluminum alloys from corrosion, in accordance with the present invention. In using the above table for buffering systems applied in a liquid phase, the indicated appropriate weight of buffer is dissolved in water.

This invention finds particular application in the manufacture of wire cable to provide corrosion resistance to the cable. The invention may also be applied after manufacture of the cable and even after the cable or metal structure has been installed to provide corrosion resistance to the cable, or to retard or halt corrosion of the cable. An environment is created surrounding the substrate that is not conducive to corrosion initiation.

As used herein, the terms "cable" or "wire cable" and "wire product" shall be understood to include wire ropes and cables having multiple wire strands or filaments. The term "wire" shall be understood to include a metal bar or rod, as well as a thread or strand. A "cable" or "wire cable" as used herein may be comprised of a single wire or multiple wires. Cables for use in pretensioning and post-tensioning concrete typically have one central wire, sometimes called a "king" wire, usually with six wires wrapped around it (although additional layers or wraps may be added dependent upon any particular application). It is to be noted, however, that this invention is not limited to cables of such form or for such use. In general, the present invention may be applied to any metal surface where corrosion protection is desired.

In one embodiment of this invention, a gel is formulated that contains buffers in sufficient quantity to enable the gel to buffer pH in the range in which the metal to be corrosion protected is naturally passive to corrosion. For protecting steel, iron or iron alloy, a gel comprising a polyalphaolefin (1 decene) base and about 10% by volume sodium silicate, about 10% by volume potassium silicate and about 10% by volume, zinc borate has been found very effective. Such a composition, when applied to the steel, iron or iron alloy surface, provides a pH buffer for the metal in the pH range between 8–13.

The base component of the gel may be selected from alkylated aromatics, phosphate esters, perfluoroalkylpolyethers, polyesters, olefins, chlorotrifluoroethylene, silahydrocarbons, phosphazenes, dialkylcarbonates, oligomers, polybutenes, and polyphenyl esters, as well as unsaturated polyglycols, silicones, silicate esters, cycloaliphatic hydrocarbons, and dibasic acid esters. For protecting or passivating steel, iron or iron alloys, a polyalphaolefin base oil having a kinematic viscosity in the range of about 30–1,400 centistokes at 40° C. has been found especially effective. Other properties to consider when choosing an appropriate polyalphaolefin base oil are molecular weight, molecular branching, thermal stability, and hydrophobicity, depending on the application. The polyalphaolefin base oil is thickened to a gel with thickeners known to the art of grease manufacturers such as polytetrafluoroethylene or silica. Buffer materials are also suitable as thickeners as long as they are compatible with the base oil.

Generally, low molecular weight, synthetic, hydrocarbon oils provide greater ease in designing and manufacturing a gel with particular desired characteristics but are more costly than less refined, high molecular weight, petroleum hydrocarbon oils. Less refined hydrocarbons may also have the disadvantage of containing sulfide compounds which can feed sulfate reducing bacteria and, in turn, tend to corrode metals such as steel, iron and iron alloys.

In another embodiment of this invention, a polymer film or adhesive is formulated that contains buffers in a sufficient quantity to enable the film or adhesive to buffer pH in the pH range in which the metal to be corrosion-protected is naturally passive to corrosion. The polymer may be a thermoplastic, thermosetting, or cross-linked system. Examples of such systems include epoxies, acrylics, polyurethanes, silicones, polyesters, alkyds, vinyls, phenolics, fluoropolymers, and latexes. For protecting steel, iron or iron alloy, a polymer-based film or adhesive comprising about 10% by volume sodium silicate, about 10% by volume potassium silicate, and about 10% by volume zinc borate has proven very effective. In another aspect of the invention, aforementioned can form zinc silicate in situ. Such a layer can be formed in situ by reaction of an alkali metal silicate with alloyed zinc in the metal surface to be protested, or with a zinc metal layer on a steel substrate surface to be protected. The zinc silicate that is formed is an inorganic layer directly in contact with, and apparently firmly bonded to, the metal surface being protected. Without wishing to be bound by any theory or explanation, it is believes that the in organic layer comprises a crystalline ceramic material. If zinc coated, that surface would still have a zinc coating remaining, and the zinc silicate would be firmly bonded to it. Hence, the metal surface is additionally protected from corrosion by an additional layer formed in situ contiguous the metal surface being protected. The zinc silicate additional layer is of the order of angstroms thick, perhaps about 50–150 angstroms thick, or even 200 angstroms thick.

Moreover, it appears that the zinc silicate additional layer is semipermeable, which allows water vapor and buffer ions to move through it, or at least into it. Hence, it remains adherent to the metal surface, to retain intimate contact with the metal surface. It is further believed that the zinc silicate layer is essentially dry at its interface with the metal surface even if its outer surface is moist. Accordingly, if water vapor is present in the overlying environment, the zinc silicate additional layer becomes progressively less moist in thickness portions closer to the metal surface. Accordingly, buffering would occur in its thickness portions spaced from the metal surface, not directly at the metal surface, unless the metal surface were exposed through breaches in the ceramic layer or in crevice corrosion areas beneath it.

The zinc silicate additional layer thus provides an additional measure of protection. For example, a zinc silicate layer can form if the coated substrate, which contains a zinc silicate intial layer, is given a heat treatment for 30–60 minutes at 175° C. before exposure to the corrosive environment. The heating step can vary widely, depending on the length of corrosion protection desired. If desired, the instant invention can be employed with a wide range of ceramic coatings.

Accordingly, in the above-mentioned new discovery, a macro-infiltrated and micro-laminated dry film coating contains an additional underlayer of zinc silicate, that is disposed in intimate contact with a metal surface that is to be protected. A moist buffered layer is believed to be embedded in the upper surface of the additional layer, at its interface with a next adjacent layer. If desired, the next adjacent layer can be an organic semipermeable layer e.g., a zinc silicate layer may be a semipermeable layer. In such instance, the dry film buffer semipermeable layer. In such instance, the dry film buffer reservoir layer can be disposed directly on the zinc silicate layer, or on a dry film semipermeable layer that is, in turn disposed on the zinc silicate layer. The dry film semipermeable layer is, of course, an organic layer. A water/mechanical erosion layer is preferably disposed on the buffer reservoir layer, to insure water repellency of the resulting layered coating.

Films and adhesives of the invention are preferably applied while the polymer carrier or base is in a low viscosity range to help ensure complete and intimate coating of the metal surface to be corrosion protected. The viscosity of the polymer-base is preferably between about 100 and 15,000 centipoise (25° C.), depending on the application. Brushed surfaces (for example) require a more viscous base than ones that will be coated by a more fluid spray, dip or dip-spin. Thereafter, the film/adhesive may be cured by suitable methods known in the art (generally exposure to air) to produce a protective, buffering system around the base metal.

In still another application of the invention, buffer materials are added to friction materials such as those used in the manufacture of brakes. Typical examples of such friction materials are phenolic thermoset resins containing iron powder and/or steel fibers or other metal fibers for reinforcement. Such buffer materials may be added as particles to the dry mixture of the iron powder and/or steel or metal fibers. Preferably, such buffer materials are applied to the iron powder and steel or metal fibers themselves, for example by a spray dry technique such as by spraying atomized or vaporized sodium silicate solutions or other buffer material on the powder and fibers and then condensing it to a film on the powder and fibers prior to formulation of the dry mixture. A Glatt spray dryer, for example, may be used to accomplish this technique. In this application of the invention, buffer materials such as sodium silicate are preferably added to the metal to be corrosion protected in two coats, with the inner coating adjacent the metal remaining soluble to retain its buffering capacity and the outer coating over such inner coating being applied at a higher temperature capable of fusing the outer coating into an insoluble barrier-type layer or more preferably a metal chloride, for example, zinc chloride, is applied to the buffer coated powder and fibers, again for example by a spray dry technique, such that a film or shell of partially insoluble metal chloride covers or surrounds the buffer coated powder and fibers. The solubility of the resulting materials decreases with the increasing quantity of metal chloride applied to the buffer coated powder and fibers and, hence, with the increasing thickness of the metal chloride covering.

In still another application of the invention, buffer materials are added to particulate buffer materials, for example by a spray dry technique. That is, vaporized sodium silicate or other buffer material may be sprayed on particulate sodium silicate or other buffer. A metal chloride, preferably zinc chloride, is then applied, again for example by a spray dry technique, over the buffer coated buffer particles. The metal chloride provides a partially insoluble cover to the coated particle. For example, zinc chloride applied over a sodium silicate buffer results in a zinc silicate film covering the buffer coated buffer particles. The more metal chloride applied, the greater the degree of insolubility of the covering. Such coated buffer particles may be added to dry mixtures of friction materials as an alternative to, or in addition to, buffer coating of the friction materials themselves as discussed above. In such use, the coated buffer particles provide corrosion control when the friction materials are included in brake pads, for example.

Other materials may be added to the compositions of the present invention to further tailor them to their desired applications. For example, additives such as ceramic silicates (zircon for example) or silicas (fumed silica, silicon dioxide, amorphous silica, for example) may be used to control viscosity and improve thermal resistance. Polymers such as polyethylene powder, nylon, Teflone or tetrafluoroethylene fluorocarbon and polyester may be added to provide extreme pressure tolerance properties for improved fatigue performance. Pigments may be added to provide color. Such additives should be selected to be compatible with the primary purpose of the invention, which is to serve as a pH buffer.

Materials may also be added to enhance the buffering or corrosion resistance of any given metal. For example, silver nitrate may be added to react with possible chlorides to form precipitates with limited solubility, thereby helping to prevent the chlorides from being available to corrode steel, iron, or iron alloys.

Preferably, the compositions and methods of this invention will not employ heavy metals such as zinc, chromium, nickel, lead, cadmium, copper or lithium, especially in pure metal form. Zinc borate is generally acceptable because it has very limited solubility. concern is greatest for pure metals or soluble cations. The invention by nature does not release components except where needed, such as hydroxyl ions to buffer pH, and thus may be generally considered to be environmentally safe or friendly, or of providing "green" protection.

In applying the invention, once a composition of the invention has been formulated with the ability to act as a buffer for a desired pH range—the pH range at which the metal has a natural passivity to corrosion—the composition is positioned proximate the metal it is to protect.

For example, the gel, adhesive, and film compositions of the invention may be applied to metal cable during manufacture. In such application the buffered carrier is preferably applied completely to at least the central or "king" wire as well as the interstices immediately surrounding the "king" wire. The film or adhesive compositions may be cured to provide a more permanent, protective, buffering region around the treated wires.

Whether or not the compositions have been applied to the wires used to manufacture a cable, they may be applied after the cable has been made or installed. Thus, the compositions of the invention may be pumped through holes or cracks in reinforced concrete to reach and protect the underlying reinforcing bars, cables or the like. Thixotropic gel compositions are especially attractive for this service.

In certain applications, compositions of the invention, once they have been applied, may be given an outer coating in the form of a thermoplastic, paint or the like. For example, bridge stays are constantly exposed to adverse marine environments; thermoplastic or other polymeric outer sheaths on the stays help to protect the stays after they have been coated with a composition of the invention. When the composition is a gel type to be used on cable applications where bonding with concrete is desired or when an outer coating is to be applied, the composition should be restricted to covering the inner wires of a cable to help prevent adhesion problems involving the composition and the concrete or polymeric outer coating.

The use of an outer polymeric sheath is not always advocated in the case of cable which is used in pretensioned or prestressed concrete, because the cable generally must bond with the concrete; an outer sheath might very likely interfere with such bonding.

An advantage of the invention is that its effectiveness is not dependent on, nor does it need, an outer coating or covering.

The compositions of the invention may also be applied to various metal assemblies. For example, adhesives of the present invention may be applied to lap joints wherein two metal sheets are overlapped and joined by welding, riveting, mechanical folding, or the like. The buffered adhesives are applied to protect the metal joints from corrosion.

The gel and adhesive compositions of the invention have particular application to nut/bolt assemblies to prevent corrosion-induced seizing. In such applications, the gel is preferably applied to the threads of the nut or bolt both before and after the units are connected.

Tests have shown that metals coated with gel, film, and adhesive compositions of this invention show substantial resistance to corrosion. Even after corrosion has begun, applications of the compositions in accordance with the invention have resulted in a halting or significant retarding of further corrosion. Thus, this invention has application not only in manufacturing metal products, but also in on site prevention and rehabilitation of metal products.

To further illustrate the present invention, but not by way of limitation, the following examples are provided.

EXAMPLE I

The following materials were used:
- 12 inch long bare steel No. 5 rebar (ASTM-A615) samples, available from Chapparal Steel Co.;
- Synthetic Polyalphaolefin Hydrocarbon Gelled Lubricant (NYOGEL 747G®) from William F. Nye, Inc.;
- Powdered Potassium Silicate (KASIL SS®) from PQ Corp.;
- Sodium Silicate GD®, available from PQ Corp.;

Zinc borate (BOROGARD ZB®), available from U.S. Borax Co.;

Anti-sieze and lubricating compound ( NEVER-SEEZ®) from Bostik.

First, approximately 50 ml each of the potassium silicate, sodium silicate, and zinc borate powders were mixed together for approximately 15 minutes to provide a homogeneous buffered composition. A 24 ml sample of the dry powder mixture was then slowly added to a 40 ml sample of the NYOGEL® polyalphaolefin material to produce a gel with 60% buffering agents by volume to achieve a buffer range of pH 10–12.

Three sets of rebar samples were then prepared for testing. In all of the samples, surface scale and corrosion initially present on the rebar was left undisturbed.

The first set was designated as the control group; consequently, no treatment was applied to these rebar samples. The second set was prepared by brushing on approximately 0.50 gram/inch of pure NYOGEL 747G® gel to the middle 5 inches of the rebar samples, while the third set was prepared by brushing on approximately 0.68 gram/inch of the buffered NYOGEL® mixture to the middle 5 inches of the rebar samples. The samples were then exposed to a 5% salt solution in a constant temperature environment for 1632 hours, in accordance with ASTM B117-73. The extent of corrosion on the test parts was determined by visual inspection at time intervals of 24–72 hours.

TABLE C

| Test Pan | Salt Spray | |
|---|---|---|
| | % Red Rust* | Test Hours |
| Control rebar | 100% | 24 |
| Pure gel rebar | 100% | 96 |
| Buffered gel rebar | 38% | 1632 |

*Average of three samples per set

The pure NYOGEL 747G® gel rebars had red corrosion spots beneath the gel at 24 hours and were completely covered with red rust at 96 hours. on the other hand, the buffered gel rebars, after showing initial signs of corrosion under the gel at 96 hours, maintained the total level of corrosion of each rebar below 40% throughout the experiment. It is evident, therefore, that the buffered gel material is capable of slowing both the onset and progression of corrosion on metal surfaces, compared to pure gel compounds.

EXAMPLE 2

The following materials were used:

Bare steel M12X40 bolts and CLO8 nuts from Bossard (DIN 933 & 934);

Zinc plated steel 5/16 inch×2.5 inches long hex head bolts with NF threads and corresponding nuts from Westlakes Hardware;

AM940126 Experimental synthetic polyalphaolefin hydrocarbon gelled lubricant from William F. Nye, Inc.;

powdered potassium silicate (KASIL SS®), available from PQ Corp.;

Sodium silicate GD®, available from PQ Corp.;

Zinc borate (BOROGARD ZB®), available from U.S. Borax Co.;

Anti-seize and lubricating compound (NEVER-SEEZ®) from Bostik.

First, approximately 25 ml each of the potassium silicate, sodium silicate, and zinc borate were mixed together for approximately 15 minutes to provide a homogeneous buffered composition. A 75 ml sample of the dry powder mixture was then slowly added to a 250 ml quantity of the AM940126 to produce a gel with 30% buffering agents by volume which produced a buffered range of 9–11 pH.

Four sets of bare steel bolt/nut assemblies and four sets of zinc plated steel bolt/nut assemblies were then prepared for testing. In all of the samples, surface scale and corrosion initially present on the nuts/bolts were left undisturbed. Furthermore, all of the samples were tested with the nuts screwed to a point midway on the bolts.

The first set of bare steel bolt/nut assemblies and the first set of zinc plated steel bolt/nut assemblies were designated as the control groups; consequently, no treatment was applied to these samples. The remaining three sets of bare steel bolt/nut assemblies and the remaining three sets of zinc plated steel bolt/nut assemblies were prepared by coating each of the bolt/nut assemblies with pure AM940126 gel (set 2), buffered AM940126 gel (set 3), and NEVER-SEEZ® (set 4). (NEVER-SEEZ® contains hydrocarbon and heavy metal components and presents environmental considerations; its manufacturer claims it protects against extreme heat, corrosion, rust, pitting, seizure and carbon fusion.) These compounds were brushed on to their respective bolts to obtain a uniform coating which completely filled the threads. The nuts were then screwed on to the bolts, and excess material was removed by brush. Upon assembly, the threads at the end of the bolts, where the nuts had passed, were recoated with the appropriate material.

The samples were then exposed to a 5% salt solution in a constant temperature environment for 1464 hours (or until failure, whichever occurred sooner), in accordance with ASTM B117-73. Seizing was determined by manually checking the nuts for movement on the bolts. If more force was required to initiate movement than could be generated with finger pressure, the specimen was deemed as failed.

TABLE D

| Test Part | Hours to Seizing* |
|---|---|
| Control bare steel assemb. | 462 |
| Pure gel bare steel assemb. | 732 |
| Buffered gel bare steel assemb. | 1104 |
| NEVER-SEEZ ® bare steel assemb. | 1356 |
| Control zinc plated steel assemb. | 816 |
| Pure gel zinc plated steel assemb. | 2811 |
| Buffered gel zinc plated steel assemb. | 2483 |
| NEVER-SEEZ ® zinc plated steel assemb. | 1598 |

*Average of four samples per set

The buffer materials which were added to the AM940126 synthetic polyalphaolefin gel significantly extended the amount of time to development of a seized condition on the bare steel bolt/nut assemblies compared to the AM940126 material by itself and offered a performance comparable to the commercial anti-seize compound that was tested. From an environmental standpoint the buffered gel is superior to the commercial product.

Three of the zinc plated samples with buffered gels performed as well as or better than the rest of the zinc plated and bare steel samples. However, for unknown reasons one zinc plated sample with buffered gel and one zinc plated sample with NEVER-SEEZ® failed significantly earlier than the other samples in their respective groups. This early failure resulted in a lower than expected average for the buffered set—lower than with the pure AM940126 gel. However, both the AM940126 gel and the buffered gel out-performed the NEVER-SEEZ® material in the zinc plated nut/bolt assemblies.

EXAMPLE 3

The following materials were used:

NeoCryl® A640 acrylic polymer from Zeneca Resins;

Texanol® ester alcohol (2,2,4-Trimethyl-1,3-Pentanediol) from Eastman Chemical;

BenzoFlex® 9-88 (Dipropylene Glycol Dibenzoate) from Velsicol Chemical Corp.;

Ethyl alcohol, Reagent Grade, available from Aldrich Chemical Co.;

Columbia Blue Dye D298 from Day-Glo Color Corp.;

N grade sodium silicate liquid from PQ Corp.;

Zinc electroplated steel conduit end-fitting assemblies. (Fabricated metal fittings assembled onto the ends of parking brake cable conduit assemblies.)

A generic acrylic polymer formulation was prepared with the following components:

| Component | Weight % |
| --- | --- |
| NeoCryl ® A640 | 79.2 |
| Texanol ® | 10.2 |
| BenzoFlex ® 9-88 | 1.4 |
| Water | 8.5 |
| Ethyl Alcohol | 0.6 |
| Columbia Blue Dye D298 | 0.1 |

Approximately 15 ml of N grade sodium silicate was slowly added (mixed) into 85 ml of the generic acrylic polymer formulation. A first group of zinc plated steel conduit endfitting assemblies were dipped one at a time into the acrylic polymer formulation containing the liquid sodium silicate, and allowed to drip off and air dry for 24 hours.

A second group of zinc plated steel end-fittings from the same lot of plated fittings was dipped one at a time into just the generic acrylic polymer formulation (no sodium silicate) and allowed to drip off and air dry for 24 hours.

In addition, a third group of zinc plated steel end-fittings from the same lot of plated fittings was retained for testing as a control.

Six pieces from each of the three groups of fittings were subjected to ASTM-BI17 salt spray testing and provided the following results:

| GROUP | AVERAGE HOURS TO FIRST RED | AVERAGE HOURS TO 5% RED (FAILURE) |
| --- | --- | --- |
| Zinc Plated Only | 36 | 56 |
| Zinc Plated With Acrylic Polymer | 72 | 104 |
| Zinc Plated With Acrylic Polymer Coating Containing Liquid Sodium Silicate | 364 | 428 |

The addition of the liquid sodium silicate to act as a buffer according to the teachings of this invention yielded approximately a 5 times improvement in corrosion resistance.

In a most recent preferred example of the invention, the preferred resin for all layers of a dry film coating is NeoRez R9637 a waterborne polyurethane dispersion from Zeneca Resins. For a three layer dry film coating, the first and third layers would be films of 75% by weight NeoRez R9637 and 25% water, as applied. The middle layer, as applied, is 80.5% by weight of the same resin, 6.5% by weight N Grade sodium silicate, and 13.0% by weight water.

It is to be understood that the foregoing is illustrative only and that other means and techniques may be employed without departing from the spirit or scope of the invention as defined in the following claims.

What is claimed:

1. A method of inhibiting corrosion of steel members comprising at least one wire rope, cable, strand and rebar that are used to reinforce concrete which comprises coating the steel members with at least one layer of a fluid, said fluid comprising at least one synthetic carrier and at least one buffer which in the presence of moisture dissolves to provide a pH at which the steel has a natural passivity to corrosion.

2. A method of rehabilitating steel members used to reinforce concrete after said members have begun to corrode, said method which comprises pumping into cracks in said concrete a thixotropic composition containing a buffer which in the presence of moisture dissolves to provide a pH at which the steel has a natural passivity to corrosion.

3. A process for treating a reinforced concrete structure comprising:
preparing a composition comprising a combination comprising at least one synthetic carrier and at least one silicate,
contacting the composition with the reinforces concrete structure thereby increasing the pH of the area of the structure contacted by the composition.

4. The process of claim 3 wherein the concrete structure is reinforced with at least one cables, strand, wire rope and rebar.

5. The process of claim 4 wherein the composition contacts said at least one cables, strand, wire rope and rebar.

6. The process of claim 3 wherein the at least one synthetic carrier comprises at least one of polyalphaolefin and polybutene.

7. The process of claim 3 wherein the silicate comprises sodium silicate.

8. The process of claim 3 wherein the composition further comprises zinc borate.

9. The process of claim 3 wherein the contacting comprises pumping the composition into the reinforced concrete structure.

10. The process of claim 9 wherein the composition is pumped into a hole or crack defined in the reinforced concrete structure.

11. The process of claim 3 wherein the composition comprises a thixotropic gel.

12. The process of claim 3 wherein the pH is about 8 to 13.

13. An in-situ process for treating a steel reinforced concrete structure comprising:

preparing a composition comprising a combination comprising at least one silicate and at least one polybutenes and polylaphaolefins, and;

introducing the composition into a crevice defined in the reinforce concrete structure.

14. The process of claim 13 wherein said structure is reinforced with at least one member selected from the group of wire rope, cable, strand and bars.

15. A reinforced concrete structure processed in accordance with any one of claims 1, 2, 3, 13 or 14.

* * * * *